G. W. ZEIGLER.
Cultivator.
2 Sheets—Sheet 1.
No. 76,687.
Patented April 14, 1868.
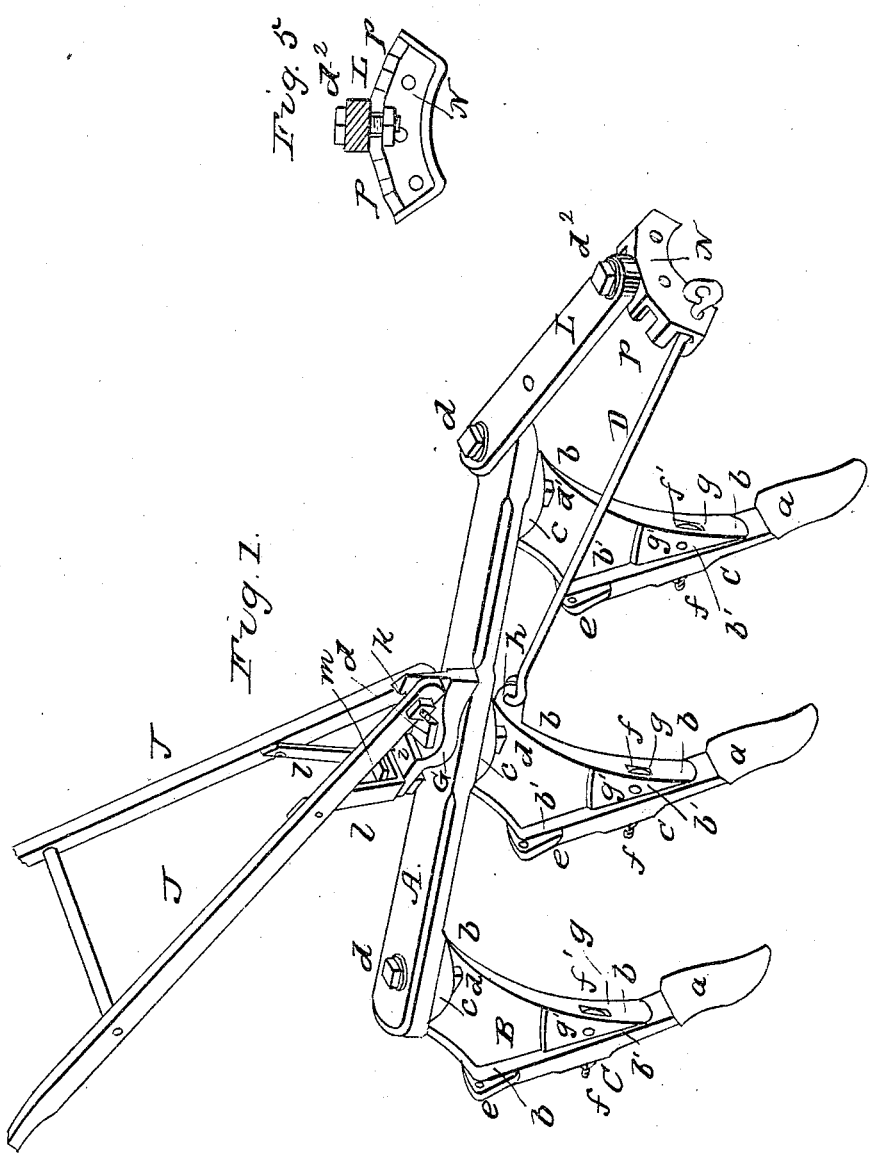

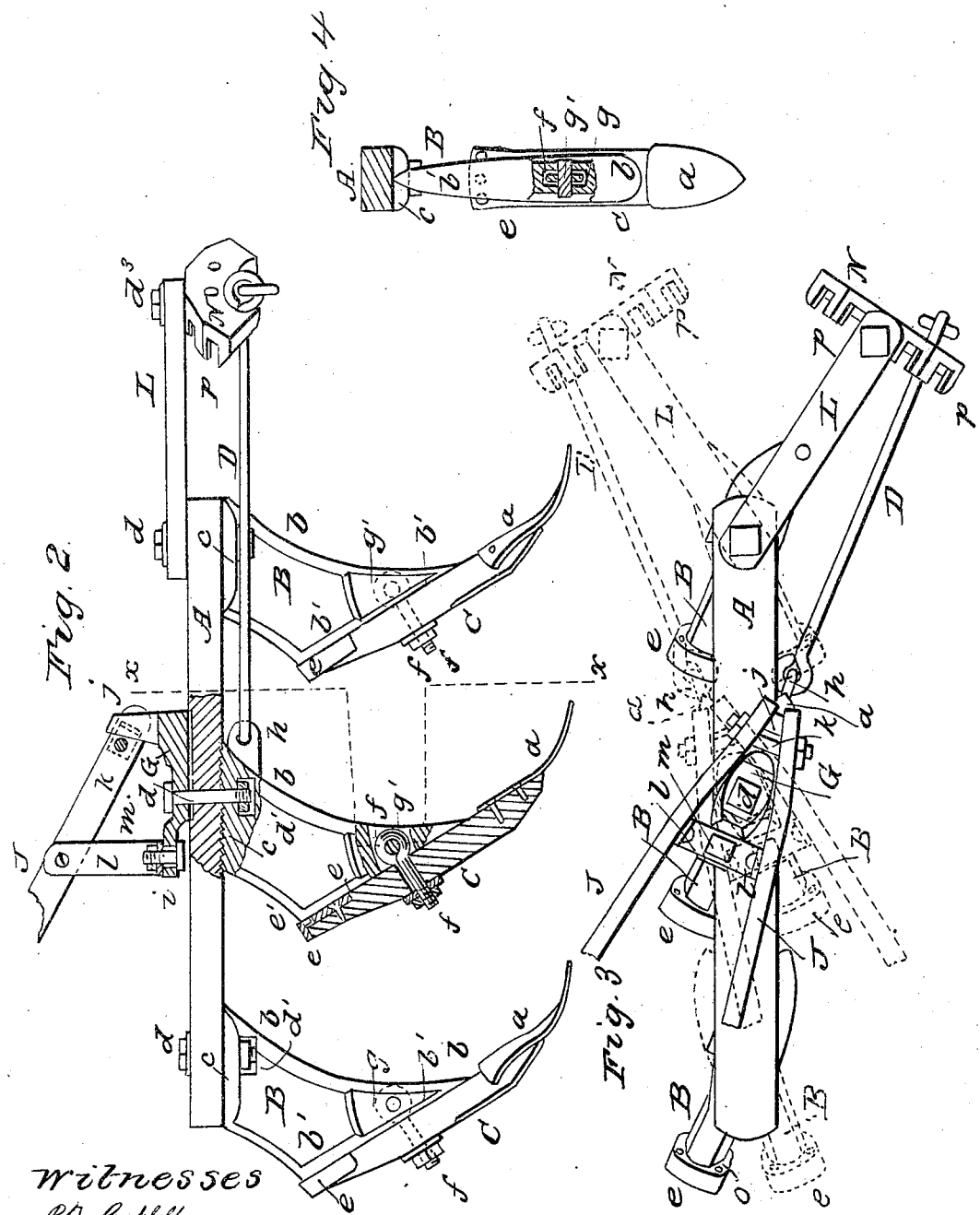

United States Patent Office.

GEORGE W. ZEIGLER, OF MAUMEE, OHIO.

Letters Patent No. 76,687, dated April 14, 1868.

IMPROVEMENT IN LAND-TILLER.

The Schedule referred to in these Letters Patent and making part of the same.

TO ALL WHOM IT MAY CONCERN:

Be it known that I, GEORGE W. ZEIGLER, of Maumee, in the county of Lucas, and State of Ohio, have invented a new and improved Land-Tiller; and I do hereby declare that the following is a full, clear, and exact description thereof, reference being had to the accompanying drawings, making a part of this specification, in which—

Figure 1 is a perspective view of the implement complete, showing it arranged for cultivating plants in rows.

Figure 2 is an elevation of one side of the implement, with parts of it broken away.

Figure 3 is a top view of the implement, showing the parts arranged in two positions, for right or left-hand working.

Figure 4 is a transverse section, taken in the plane indicated by the course of red line $x\ x$ in fig. 2.

Figure 5 is an inside view of the segment-clevis applied to its adjustable beam.

Similar letters of reference indicate corresponding parts in the several figures.

This invention relates to certain novel improvements on implements which are designed for light ploughing, in cultivating crops planted in hills or rows.

It also relates to that class of cultivators or land-tillers wherein the ploughs or shovels are applied to a beam, so that they will work in gangs, and throw the earth toward or from the rows of plants.

The nature of my invention consists in so constructing a single-beam gang-plough or cultivator, that, while the ploughs or shovels can be made to run in the same line for making a single furrow, they can also be readily arranged to run at any required distance apart, according to the width of the rows of plants to be cultivated, as will be hereinafter described.

It also consists in providing a single-beam gang-plough with means whereby the line of draught can be readily changed either laterally or vertically, as may be required, and at the same time have the draught-rod attached at or near the centre of the plough-beam, so as to draw from such point, as will be hereinafter described.

It also consists in providing, in a single-beam gang-plough, certain means whereby the handles or stilts can be readily adjusted and set in line with the line of draught, whatever direction this line may be required to take, and at the same time providing for raising and lowering the said handles to suit the convenience of the ploughman, as will be hereinafter described.

It also consists in a laterally-adjustable standard-guard and holder, which is so constructed that it can be rigidly secured to its beam, at any desired angle therewith, and when so secured it will serve as a means for carrying the wooden standard to which the plough is bolted, and allowing this standard to be secured in place by an adjustable fastening and a wooden pin located considerably below the line of draught, as will be hereinafter described.

It finally consists in attaching the wooden portion of the shovel-standard of each shovel to its metal standard-guard, by means of a wooden pin and pivotal eye-bolt, the eye of which is so constructed that, should the shovel strike against an immovable object, this eye will cut the wooden pin square off, and allow the shovel-standard to separate from its metal guard, as will be hereinafter described.

To enable others skilled in the art to understand my invention, I will describe its construction and operation.

In the accompanying drawings, A represents a strong wooden beam, of suitable length, width, and thickness, to which three shovel or plough-standards are attached, at regular distances apart. Each standard consists of a curved metal stock or guard, B, and a wooden standard, C, to the lower end of which latter the shovel or plough-blade $a$ is secured, by bolts or screws. The metal stock B is surrounded by ribs or side flanches, so that its interior portion can be made quite thin, thus securing great strength and lightness. The front edge, $b$, of each stock curves backward and downward from the enlarged head-piece $c$ to the wooden standard C, as shown in figs. 1 and 2, and increases in width as it approaches said standard, so that weeds and trash shall be swept off by the loose earth while ploughing, thus preventing the clogging up of the implement. By making this front curved edge $b$ as wide as the width of the standard C, and rounding this edge, as shown, it will not be liable to gather surface-weeds and trash. The rear bottom edge $b'$ of the said stock is inclined, so as to form an angle with the plough-beam A, for the purpose of receiving the wooden standard C. The upper end or head $c$ of this stock B is enlarged, so as to present a wide abutment against the bottom side of beam A; and the upper surface of this head is corrugated or serrated laterally, so that when it is drawn tightly in place by the bolt $d$, the corrugations will embed themselves into the wooden beam A, and the stock will thus be prevented from turning or changing its position. An opening, $d^1$, is made through the stock B, just below its head $c$, for the purpose of receiving the nut of the bolt $d$, as shown in the drawings, and holding this nut firmly while screwing up or loosening. The wooden section or standard C is provided, on its upper end, with a flanged segment, $e$, the flanges of which receive the upper end of said standard, and so confine it as to prevent it from splitting. Several holes are made through said segment, in the arc of a circle, concentric to the pivotal eye-bolt $f$, for receiving a stud, $e'$, which projects from the upper rear corner of the stock B, as shown in fig. 2, and holding the upper end of the standard firmly in whatever position it may be desired to set it. The eye-bolt is designed for confining the standard C against the inclined surface or edge $b'$ of the stock B. The eye $f'$, which is formed on this bolt $f$, enters a slot, $g$, which is made in or through the stock B, and receives through it a wooden pin, $g'$, which will give way and allow the standard to detach itself from its stock B should the shovel strike an immovable object. The inner edge, and, if desirable, the sides, of the eye $f'$, are flattened, so as to present two sharp angles or cutting-edges, which will cut the wooden pin $g'$ square off should the shovel strike a resisting object with considerable force.

I am aware that rounded eyes, or eyes made of round metal, and wooden pins, have been used before my invention, for the purpose above mentioned; but the round metal will not answer a practical purpose, inasmuch as it forms a kind of wedge, and is liable to be retained when it should give way. With the flat-metal eye the wooden pin will be cut squarely off, and nothing will prevent such eye from becoming detached from the object to which it was attached.

The three shovel-standards and their stocks are constructed alike, with the single exception that the intermediate stock B, has an eye, $h$, formed on it, at its upper front corner, for the purpose of pivoting the rear end of the draught-rod D to it, as shown in figs. 1, 2, and 3. The bolt $d$, which secures the intermediate stock B to the beam A, serves also to secure in place a casting, G, on top of this beam, as shown in the drawings. This casting is constructed with its bottom surface corrugated longitudinally, with an elevated heel-piece, $i$, and an upright post, $j$, which latter is of a V-shape, in horizontal section. The front ends of the handles J J are firmly clamped to the post $j$ by means of a transverse bolt, $k$, by loosening the nut on the end of which bolt these ends of the handles can be raised or depressed. In rear of this post $j$, and firmly bolted to the heel $i$, are standards $l\ l$, which support the handles J, in rear of their front attachment. The bolt $m$ which secures the standards $l$ to the casting G, passes through an oblong slot which is made through the tail-piece $i$, and allows the handles J to be raised or depressed by moving the lower end of said standards forward or backward.

Upon the front end of the beam A, and on top thereof, a short beam, L, is pivoted, by means of the bolt $d$ of the front stock B, as shown in figs. 1 and 2. This beam L has a clevis, N, of a segment form, secured to it near its front end, through which the draught-rod D passes, as shown in the drawings. This clevis consists of an upper notched flange, $p$, having several notches in it for receiving the bolt $d^2$, which secures it to its beam. It is also provided with several holes through it, for receiving the draught-rod when it is desired to change the line of draught. After adjusting the beam L at the required angle with respect to the beam A, to suit different widths of rows of plants, the front end of the draught-rod D can be adjusted higher or lower, as may be required, by loosening the bolt $d^2$ and moving the clevis laterally. By detaching the clevis N from its beam L, this beam can be turned either to the right or the left side of the beam A, and the clevis attached to it again. Then, by adjusting the ploughs or shovels and the handles, a right or left-hand implement is produced.

If it is desired to make a single furrow, the ploughs or shovels, the handles, and the beam L, are all adjusted in line with the beam A. In this arrangement, the intermediate stock B, with its shovel-standard, is detached, and a washer, with an eye to hold the rear end of the draught-rod D, is applied in place thereof.

After adjusting the draught-rod, and securing it in proper position, as above described, the handles and shovel-stocks are adjusted in lines corresponding to the line of draught, and the shovel-standards set either to the right or left, according to the amount of earth it may be required to throw toward or from the plants.

Having described my invention, what I claim as new, and desire to secure by Letters Patent, is—

1. Providing a single beam, A, carrying a gang of ploughs or shovels, with a draught-rod, D, which is pivoted at or near the middle of the length of said beam, and supported at or near its front end by means of a laterally-vibrating beam, L, substantially as described.

2. Supporting the front end of a draught-rod, D, which is pivoted to the eye $h$ of the intermediate stock B, by means of a laterally and vertically-adjustable segmental clevis, N, applied to the beam L, substantially as described.

3. The adjustable casting G, provided with the standard $j$ and adjustable standards $l\ l$, for sustaining the handles J, and allowing these handles to be secured at their front ends by means of a clamping-bolt, $j$, substantially as described.

4. Providing for adjusting the handles J of a single-beam plough in line with a draught-rod, D, by means of devices G and L, which are arranged to operate substantially as described.

5. A metallic standard stock and holder B, constructed with a curved front edge, $b$, a swelled corrugated surface-head, $c$, and a slot, $g$, substantially as described.

6. The wooden shovel-carrying standard C applied to a stock, B, substantially as described.

7. The construction of the clevis N of a segment form, with a notched flange, $p$, and also with perforations through it for receiving the draught-rod D, substantially as described.

8. A single-beam gang-plough which is provided with laterally-adjustable shovel-standards B C, laterally-adjustable handles J, a vertically and laterally-adjustable clevis, N, a laterally-adjustable arm or beam, L, all arranged substantially as described.

GEORGE W. ZEIGLER.

Witnesses:
J. M. WASHBURN,
F. K. LAHA.